United States Patent [19]

Heilmayr et al.

[11] 3,825,390

[45] July 23, 1974

[54] APPARATUS FOR EXTRUDING, EMBOSSING AND CURVING SIDING

[75] Inventors: Peter F. Heilmayr; Sol B. Kimbrell, both of McPherson, Kans.

[73] Assignee: Certain-Teed Products Corporation, Ardmore, Pa.

[22] Filed: Dec. 23, 1971

[21] Appl. No.: 211,804

Related U.S. Application Data

[62] Division of Ser. No. 2,770, Jan. 14, 1970, abandoned.

[52] U.S. Cl............... 425/325, 425/385, 425/343, 425/377
[51] Int. Cl........................... B29c 24/00, B29f 3/00
[58] Field of Search........................... 425/325, 343

[56] References Cited
UNITED STATES PATENTS

| | | | |
|---|---|---|---|
| 3,243,339 | 3/1966 | Scragg et al. | 425/325 X |
| 3,635,614 | 1/1972 | Long et al. | 425/325 X |

*Primary Examiner*—R. Spencer Annear
*Attorney, Agent, or Firm*—Synnestvedt & Lechner

[57] ABSTRACT

Siding formed of thermoplastic resin material and characterized by an embossed grain texture, and by low light reflection and high impact strength. Method and apparatus are provided incorporating various steps and devices for imparting a grain texture by embossing and for reducing the gloss and increasing the impact strength, notwithstanding the embossing.

3 Claims, 15 Drawing Figures

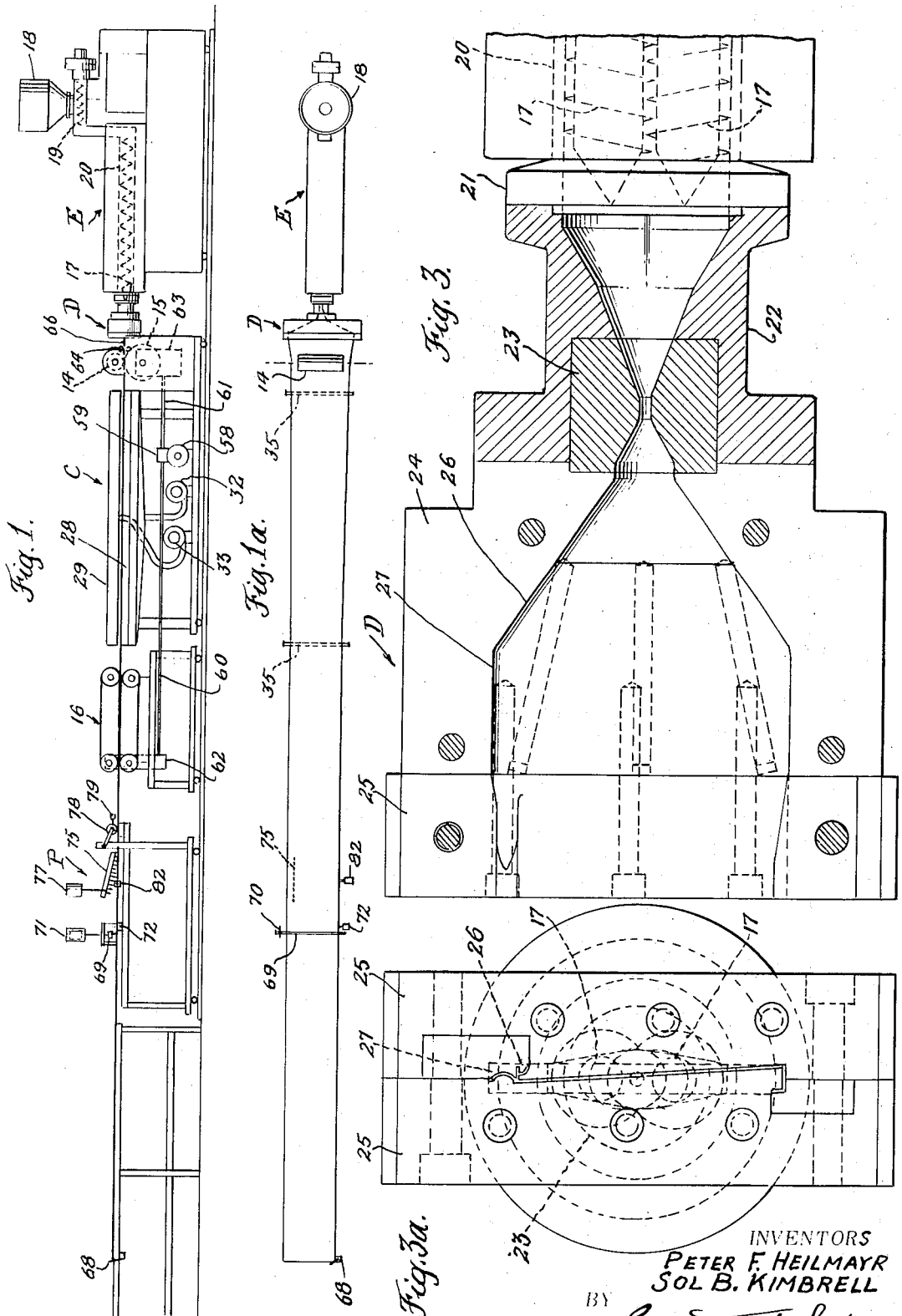

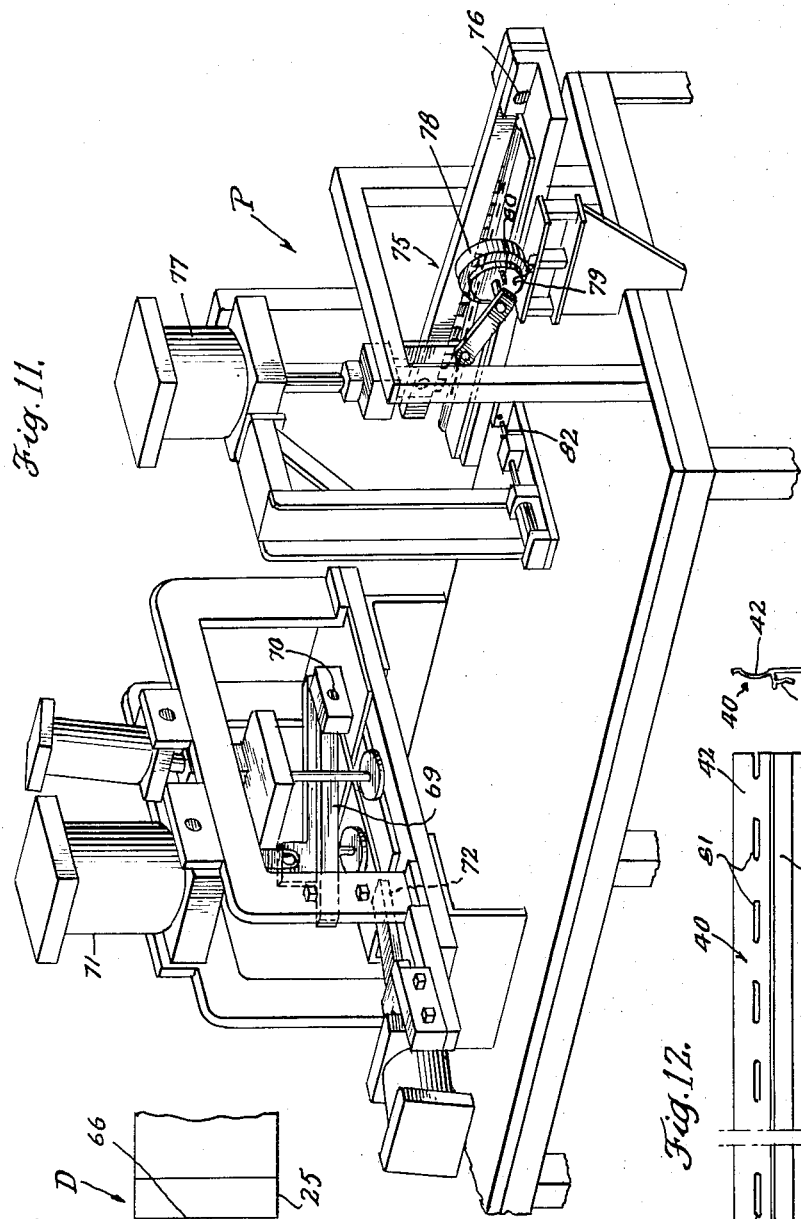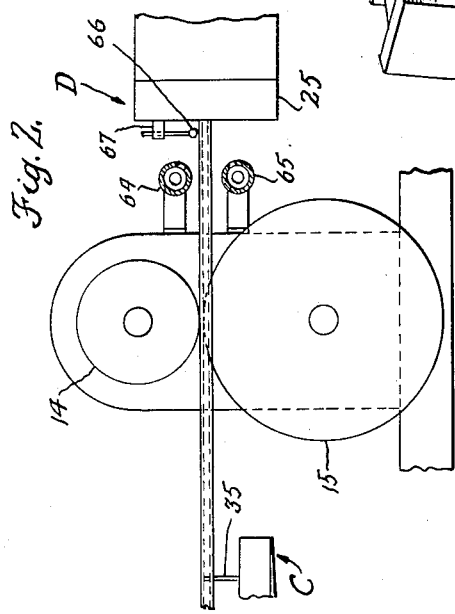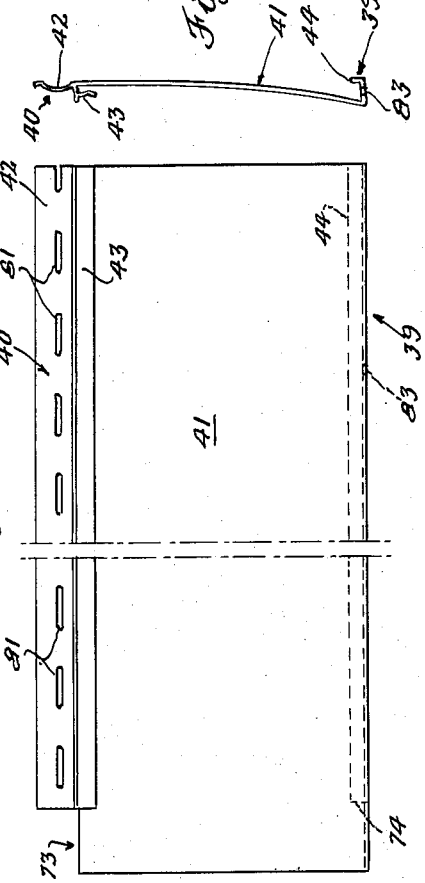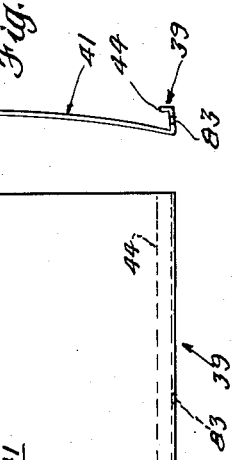

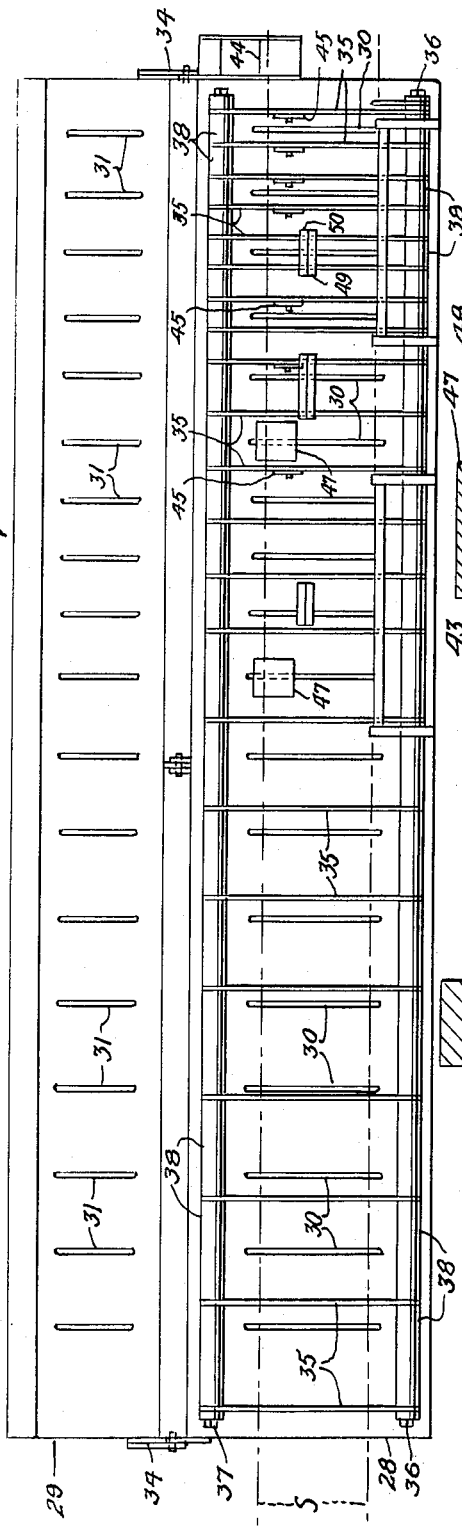

APPARATUS FOR EXTRUDING, EMBOSSING AND CURVING SIDING

This is a division of application Ser. No. 2,770, filed Jan. 14, 1970 now abandoned.

BACKGROUND AND STATEMENT OF OBJECTS

It is known to produce siding from thermoplastic resin materials and for this purpose extrusion techniques have been employed in accordance with which the resin material in plasticated form is extruded through a die orifice generally conforming with the cross sectional shape of the siding, after which the extruded siding is cooled to harden it. Thereafter appropriate lengths are cut from the hardened extrusion and various machining operations are applied. In operations of the kind above referred to, it is also known to utilize polyvinyl chloride resin materials, usually formulated with pigment and other constituents to impart special properties to the product.

The present invention is concerned with a number of improvements in a technique of the general kind just referred to, which improvements are adapted to facilitate the production of the siding and are also adapted to improve the characteristics of the siding in several respects.

For example, in accordance with prior techniques, the siding produced has frequently been characterized by a high gloss surface on the face or exposed side of the siding, and this is undesirable for at least most uses for such siding. Moreoever, a wood or grain texture has been imparted to various prior sidings of the kind referred to, but notwithstanding such texture effects, the siding still retained the undesired high gloss or high light reflection and, in addition, the technique of imparting the grain texture has heretofore frequently resulted in loss of impact strength.

Major objects of the present invention are to overcome the foregoing difficulties and disadvantages and to provide a method and apparatus for production of siding from thermoplastic resin materials, especially polyvinyl chloride resin materials, which siding not only has a grain texture effect but which is further characterized by low gloss and high impact strength.

Still further object of the present invention are to provide a method and apparatus characterized by exceptionally smooth and reliable operation, production of the siding without undesired ripple effects, and maintenance of a high degree of accuracy in the shaping of the siding and also in machining operations including, for example, the cut off, the punching of nail and weep holes, and the corner notching for facilitating overlapping and interengagement of siding pieces when installed.

How the foregoing and other objects and advantages are attained will appear more fully from the foregoing description referring to the accompanying drawings, in which:

BRIEF DESCRIPTION OF DRAWINGS

FIG. 1 is a somewhat diagrammatic elevational view of a siding production line arranged according to the present invention;

FIG. 1a is a plan view of certain parts and of the siding being produced in accordance with the production line of FIG. 1;

FIG. 2 is an enlarged somewhat diagrammatic elevational view of the embossing and certain other devices located adjacent to the discharge end of the extrusion die;

FIG. 3 is a horizontal sectional view through the delivery end of the extruder and through the extrusion die, this view being on an enlarged scale as compared with FIG. 1;

FIG. 3a is a view of the discharge end of the extrusion die shown in FIG. 3, this view being taken looking toward the left end of the die in FIG. 3;

FIG. 4 is a view looking at the entrance end of the equipment provided for sizing and cooling of the extruded siding, this view being on an enlarged scale as compared with FIG. 1;

FIG. 5 is a plan view of the sizing and cooling apparatus, with a portion of this equipment displaced to disclose interior parts;

FIG. 6 is a fragmentary front elevational view of a portion of the equipment shown in FIG. 5;

FIGS. 7, 8, 9 and 10 are fragmentary views on a further enlarged scale illustrating certain devices employed in the sizing and cooling equipment, these views being respectively taken as indicated by the section lines 7—7, 8—8, 9—9 and 10—10 on FIG. 6;

FIG. 11 is a perspective view of the cut off and punching equipment employed;

FIG. 12 is an elevational view of a portion of a siding made according tp the present invention; and FIG. 13 is an end view of the siding shown in FIG. 12 and illustrating the cross sectional shape of the siding.

GENERAL ARRANGEMENT

The general arrangement of the equipment is illustrated in FIGS. 1 and 1a and in FIG. 1 four general sections or stations are indicated, as follows.

First, an extruder mechanism indicated at E is shown at the right hand end of the production line. This extruder is adapted to receive powder polyvinyl chloride resin composition and to heat and plasticate the resin material and then deliver it into and through an extrusion die which is indicated at D.

The etrusion die (shown also in FIGS. 3 and 3a) is formed with various passages to be described, including an inlet passage for receiving the plasticated resin from the extruder, and a discharge orifice of cross sectional shape generally conforming with the cross section of the siding being made.

After delivery of the siding from the discharge orifice of the die the siding in still soft or plasticated confition is passed through the nip formed between a pair of rolls 14 and 15 (also shown in FIG. 2) one of which (14) is etched so as to emboss the siding and thereby impart a grain texture to the face side of the siding. After leaving the embosser, the siding passes into and through the equipment generally indicated at C which is provided for cooling and sizing the siding, thereby hardening the siding in the desired cross sectional shape and form. The siding is advanced through this cooling and sizing equipment by means of the puller mechanism indicated at 16.

The puller mechanism delivers the hardened siding to the station indicated at P in FIG. 1 (also shown in FIG. 11) at which lengths of the siding are cut off, nail and weep holes are punched, and other operations are performed, as is described more fully herebelow.

EXTRUDER

Although from the standpoint of a number of features of the present invention, the extruder may comprise any of a variety of known types of extrusion equipment, it is preferred and contemplated according to the present invention that the extruder be of the multiple screw type. The free ends of a pair of screws of such an extruder are indicated at 17—17 in FIG. 3. The extruder is adapted to be fed with the resin material in powder form, by delivery of such resin material into the hopper indicated at 18, from which it is delivered by the feed screw 19 into the barrel 20 surrounding the twin screws 17—17. Provision is made for careful regulation of the temperature of the extruder, for which purpose the extruder is advantageously divided into several temperature control zones, as is known with equipment of this type.

EXTRUSION DIE

As above indicated, the extruder delivers into the entrance end of an extrusion die indicated generally at D in FIG. 1 and shown more fully in FIGS. 3 and 3a. This die structure comprises several assembled parts, including an adaptor or entrance portion 21 having a passage shaped to mate with the cavities of the twin screws of the extruder. The next portion of the die comprises a transition section 22 in which the die formed decreases in cross sectional area to a narrow restriction formed in a restriction block 23. This block is replaceable with others of different contour, according to the particular requirements of the siding being extruded.

At the delivery end of the passage in the restriction block, the passage is circular in cross section, but in the following portion of the die indicated at 24 the passage flattens and widens to a size as required by the opening in the die lips 25. It will be noted that in the portion 24 of the die (which is split into two parts) the passage progressively widens as indicated at 26 and then maintains a uniform width through a substantial distance as indicated at 27. In a die provided for the extrusion of a siding of about 8 inches in width, the portion 27 of the die passage may be from about 1 to about 6 inches in length.

The reduction of the die passage to a narrow restricted port in the restriction block 23 is of importance in hemogenizing the resin material, and the employment of the portion 27 of the die passage having uniform which is of importance in equalizing the flow and substantially eliminating turbulence in the zone immediately preceding delivery through and from the orifice in the lip portion 25 of the die.

The die lips 25 may also be replaced in order to provide for alternative production of sidings of different types, for instance a siding of the type shown in FIGS. 12 and 13 which is the preferred form of an 8 inches siding, or a siding of about the same overall width but made up of two 4 inches siding panels, sometimes referred to as "double 4 inches siding".

The shape of the passage progressively varies in the lip portion of the die in order to provide a discharge orifice of the desired shape, although the terminal portion of this orifice is preferably of uniform cross section throughout some appreciable length. The details of the shape of the die passages need not be considered herein as they form no part of the present invention per se.

It should also be understood that the discharge orifice will not necessarily exactly correspond in size and shape to the siding to be made. Indeed, in order to compensate for swelling and shrinkage factors which are present in all extrusion operations, it is preferred to utilize dimensions in the discharge orifice which are somewhat different from corresponding dimensions of the siding being made. For example, the width of the die passage is desirably increased about 5 to 15 percent as compared with the width of the siding, and the thickness of the passage is desirably reduced by approximately 50 percent, as compared with the thickness of the siding being produced.

Embossing, Cooling and Sizing

After leaving the extrusion orifice of the die, the siding enters the nip between rolls 14 and 15 which constitute an embossing mechanism for imparting to the face surface of the siding a wood grain texture effect. In the embodiment illustrated the siding is extruded generally horizontally, with the face side presented upwardly, and the roll 14 is etched or otherwise configured to the desired grain texture in order to provide the grain texture effect upon the siding. Roll 15 is desirably rubber faced so as to provide a resilient backing for maintaining the siding in contact with the embossing roll 14. From FIG. 1a it will be observed that the roll 14 is of a length less than the width of the siding being extruded. Roll 15 is preferably of the same width and by employing rolls of width less than the width of the siding, these rolls do not deform the butt and hanger edge portions of the siding but engage only the panel intervening between the butt and hanger edges. The embossing rolls are driven in a manner which is explained below in connection with the drive system provided for the puller mechanism 16.

After leaving the embossing rolls the siding enters cooling and sizing mechanism indicated in FIG. 1 at C and shown in greater detail in FIGS. 4 to 10 inclusive. A base 28 and a lid 29 are formed as plenum chambers, the base having a series of spaced slots 30 and the lid a similar series of slots 31 which serve to deliver air from the plenum chambers onto the upper and lower surfaces of the siding. The plenum chamber of the base 28 is supplied with air by the blower 32, and the blower 33 serves to supply air to the plenum chamber in the lid 29. The lid 29 is pivotally connected to the base by hinges 34 so that the lid may be opened (see particularly FIG. 4) in order to provide access to the feed path of the siding through this part of the mechanism. When in closed position, the lid is positioned as indicated by the dot and dash lines 29a in FIG. 4. It will be understood that a flexible tube is included in the connection between the blower 33 and the lid 29 so as not to interfere with the opening and closing movement of the lid.

A series of templates 35 are mounted upon the upper surface of the base 28, these templates being extended transversely of the siding which is indicated by the dash lines S in FIG. 5. Toward the upstream end of the cooling and sizing mechanism (the righthand end as seen in FIGS. 5 and 6) the templates are positioned close to each other, but the spacing increases toward the downstream end of this mechanism. The closer spacing at the upstream end is provided in order to ensure maintenance of the relatively soft siding in the desired cross sectional contour, but as the siding moves downstream, it is progressively cooled and progressively hardened by the air delivered to the upper and lower surfaces from the plenum chambers, and for this reason the templates need not be as close together in the downstream portion of this equipment. The templates are mounted by means of supporting rods 36 and 37 which pass through apertures in the ends of the templates and on which spacing sleeves 38 are threaded.

The templates have upper edges which are contoured to conform to the desired cross sectional shape of the panel of the siding intervening between the lower or butt edge and the upper or hanger edge thereof. This edge contour clearly appears in FIG. 4 and it will be seen that it conforms in general to the cross sectional contour of the siding as it appears in FIG. 13. In FIGS. 12 and 13 the butt edge is indicated at 39 and the hanger edge is indicated at 40, the intervening panel 41 being at least in part curved.

The details of the shape of the butt and hanger edges appear to best advantage in FIGS. 7 to 10. Here it will be seen that the hanger edge includes a curved portion 42 which is convex on the front or face side of the siding and concave on the reverse side, which latter is the side applied to the wall when the siding is installed.

The hanger edge also includes a projecting portion 43 providing a recess for receiving the upturned flange or lip 44 provided on the butt edge of the siding.

Sizing and shaping devices are incorporated in the cooling and sizing mechanism for ensuring accurate formation of various of the above described parts of the butt and hanger edges of the siding. These devices include the following:

As seen in FIG. 7, a block 44 is positioned at the entrance end of the cooling and sizing mechanism and has a concavely curved surface adapted to size the curved nailing strip 42. One end of this block is also shaped to assist in properly sizing and shaping a portion of the projecting lip 43. The concave side of the curved nailing strip 42 is also adapted to be sized by the edges of a series of washers 45 which are mounted on several of the templates 35, preferably with freedom for adjustment movement transversely of the siding. The washers are provided with a slot 46 for this purpose as shown in FIG. 8. One or more sizing blocks 47 are arranged downstream of the block 44 and are provided with concavely curved surfaces for cooperation with the convexly curved surface of the nailing strip 42. These additional blocks also advantageously are provided with ports 48 for delivery of air to the surface of the nailing strip to promote the cooling and hardening thereof in the desired curved shape.

The lip 43 of the hanger edge is also sized by means of block elements engaging the lip, in the manner shown in FIG. 10. Here a pair of blocks 49 and 50 are interconnected by bolts 51 and carry sizing elements 52-53 for cooperation with the inside surface and the outside surface, respectively, of the hanger lip 43 in order to ensure hardening of that lip in the desired shape. Hardening is again promoted by the use of air ports 54 delivering air directly to the surface of the hanger lip 43. Similar ports 55 deliver air to the face side of the panel 41 in the region adjacent to the hanger edge, as is clearly shown in FIG. 10.

FIG. 9 illustrates a sizing or shaping element 56 cooperating with the lower face of the butt edge 39 of the siding. The sizing surface is here again provided with air ports indicated at 57 for promoting the hardening of this portion of the siding.

All of the air ports shown in the sizing elements in FIGS. 8, 9 and 10 are preferably supplied with air under some appreciable pressure so as to distribute the air over the surfaces being sized and thereby assure hardening of those surfaces in the desired contour. The air supplied to the plenum chambers in the base and lid 28 and 29 is advantageously at relatively low pressure as compared with the air supplied through the portage in the sizing blocks, but the air supplied through the plenum chambers is more widely distributed through slots 30 and 31 of greater cross sectional area, so that the surfaces of the panel intervening between the butt and hanger edges are "flooded", so to speak, with cooling air.

Because of the arrangement of the production line to extrude in a generally horizontal direction, with the face side of the siding presented upwardly, it is effective to position the templates 35 so that they overlie the back side of the siding and so that the action of gravity acting upon the relatively soft or plasticated resin material serves to maintain the siding in contact with the upper edges of the templates and thus in the desired cross sectional configuration.

The puller mechanism, for instance in the form of caterpillar treads as diagrammatically indicated engages the hardened siding as it leaves the cooling and sizing mechanism and delivers the hardened siding into the cut off and punching section to be described below. However, it is here first pointed out that the drive of the puller mechanism 16 and the drive of the embossing mechanism 14–15 is desirably synchronized, and for this purpose a source of power indicated diagrammatically at 58 is provided. This power source may advantageously take the form of a hydraulic wobble plate pump having a proportionate flow divider valve 59 for adjustably proportioning the flow through the connections 60 and 61 are extended respectively to the drive unit and gear box 62 for the puller mechanism 16 and the drive unit and gear box 63 for the embossing mechanism. The drive to the embossing mechanism preferably effects drive of only the rubber roll 15, the embossing roll 14 being driven as a result of engagement with the siding. This drive system provides for synchronization of the drive of the embosser and the drive of the puller mechanism, which is of importance in order to ensure that the desired grain texture is imparted to the siding by the embosser.

In connection with the arrangement provided for cooling and sizing the extruded shape, attention is further directed to certain devices shown in FIG. 2. Air distributing ducts 64 and 65 are positioned above and below the siding as it leaves the lips 25 of the die, these ducts being provided with portage for directing air against the die lips and also against the surface of the siding emerging from the extrusion orifice. The cooling action of these ducts 64 and 65 upon the lips of the die aids in maintaining a relatively low temperature at the exit face of the die and this is one of the factors contributing to the production of siding having low light reflection. Another feature illustrated in FIG. 2 is the provision of a bar 66 adjustably mounted by means of a bracket 67, this bar being of length sufficient to engage at least most of the width of the panel of the siding lying between the butt and hanger edges. This bar is adjusted to apply a slight frictional drag to the face surface of the siding and this serves to prevent longitudinal rippling or corrugation of the siding as it is extruded. Such rippling has sometimes been troublesome to overcome but is effectively eliminated by applying slight frictional drag in the manner just described.

With regard to the arrangement shown in FIG. 2, it is also to be noted that the spacing between the lips of the die, the embossing rolls and the first template 35 of the sizing mechanism is such that all of these parts are brought close together. In a production line for producing an 8 inches siding of the kind shown in FIGS. 12 and 13, this spacing is desirably such that the nip of the embossing rolls is less than about 12 inches, for instance 11 inches from the lips of the die, and further such that the first template 35 is not more than about 20 inches from the embossing nip, for instance about 14 or 15 inches. This close coupling ensures that the resin of the siding will still retain sufficient plasticity or softness to permit proper embossing and also to permit gravity to properly shape the sliding over the templates.

Cut Off and Punching Station

As above noted the puller mechanism delivers the hardened siding into the mechanism of station P shown in FIG. 1 and also in FIG. 11. The details of this mechanism need not be considered herein as they form no part of the present invention per se, but the general arrangement thereof is to be noted as follows.

First, a limit switch 68 adapted to be engaged by the siding as it advances through and beyond the station P (see FIGS. 1 and 1a) trips the cut off blade 69 which is pivotally mounted at 70 and actuated by the cylinder 71. This same limit switch also actuates the end notching devices, such as indicated at 72, which serve to provide the cut outs indicated at 73 and 74 at the leading end of the next siding section. The devices 69 and 72 are advantageously mounted upon a carriage which is movable with the siding in a manner which need not be considered in detail herein.

A punching device indicated at 75, pivoted at 76 and actuated by the cylinder 77 is adapted to be tripped and operated by means of a metering wheel 78 rotated by virtue of engagement with the siding and periodically tripping a micro-switch 79 by means of the tripping pin 80. This punch 75 provides the nailing holes 81 in the nailing strip 42 (see FIG. 12). This metering wheel also serves to trip the punch 82 which serves to provide the weep holes 83 in the butt edge of the siding (see FIG. 13). The punches 75 and 82 are desirably mounted on a carriage in a manner to move with the advancing siding.

Operation

In considering the production of siding according to the present invention it is first pointed out that although a variety of resin materials may be utilized, it is preferred to employ compositions of which the chief resin constituent is a polyvinyl chloride resin, most advantageously a polyvinyl chloride resin with an inherent viscosity value between 0.90 and 1.10.

In one type of formulation which maybe used, the resin system includes a tin or barium-cadmium stabilizer, and further incorporates a minor amount of an acrylic material such as methyl methacrylate, or a chlorinated polyethylene, either of which will serve as an impact modifier, to increase impact strength.

In such a typical composition, a pigment is desirably included, preferably a white pigment such as titanium dioxide, which may be employed in a amount equal to about from 8 to 16 parts by weight of the total composition. The presence of one or more lubricants is desirable to facilitate extrusion, for instance a combination of paraffinic and metal soap lubricants.

Commercially available compositions which contain polyvinyl chloride resin and which may be used according to the invention are sold under the tradenames GEON 85821 and GEON 85826 by B. F. Goodrich Mfg. Co.

In the preferred practice of the invention the resin compositions to be employed are used in powder blend form, rather than pellet form, and the powdered materials are desirably intimately intermixed before use. Compositions in the powder blend form are desirably employed not only because of the relatively low cost of materials in that form, but also for other reasons. For example, a powder blend has less heat history than pellets which have previously undergone an extrusion and pelletizing operation. In view of this, siding made from a powder blend has greater remaining long term heat stability than would siding made from pelletized material. Moreover, where compositions are specially formulated to provide various desired physical and chemical characteristics, the employment of the materials in powdered form facilitates the blending of the specific composition desired.

The selected resin composition is introduced into the feed hopper 18 of the extruder and is heated and plasticated by the extruder, and ultimately delivered thereby through the die D and out of the die orifice while still in its initial plasticated condition. It will be observed from FIG. 3a that the panel of the siding intervening between the butt and hanger edges is flat or planar, whereas the siding panel of the finished siding (see FIG. 13) is curved. This initial flat panel is engaged by the friction drag bar 66 (see FIG. 2), and while the product is being extruded the die lips and also the upper and lower surfaces of the siding are somewhat cooled by the action of the air distributing ducts 64 and 65. However, before any hardening or solidification of the resin in depth occurs, the flat panel of the siding is fed into the nip between the embossing rolls 14 and 15, and the texture effect is therefore imparted to the resin prior to hardening in depth.

The siding then passes while still in soft or plasticated condition into the sizing and cooling section of the equipment and from FIG. 2 it will be noted that the first of the sizing templates 35 is located quite close to the embossing rolls, in view of which the action of gravity will properly shape the panel of the siding to the desired curvature. The siding then continues through all of the various sizing and cooling devices described above with particular reference to FIGS. 4 to 10.

The sequence of operations just referred to and the manner in which they are performed is of great importance in the production of siding which is not only accurately formed but which also has an exceptionally desirable combination of characteristics both from the standpoint of physical characteristics and appearance of the product. First the imposition of the drag by the bar 66 substantially eliminates ripple tendencies. The use of devices (64 and 65) for air cooling the lips of the die, and also the use of air cooling in the sizing and cooling section is of great importance in minimizing surface gloss, so that the siding produced has low light reflection. It will be observed that almost the entire exposed or face area of the panel intervening between the butt and hanger edges is cooled by means of cooling air only, and without the use of metal cooling surfaces in contact with the product, which latter have a tendency to exaggerate the gloss and therefore the light reflection of the resin surface.

The shaping of the panel of the siding to its desired curved form only after the embossing has occurred not only permits use of a simple form of cylindrical embossing roll, but also is of importance because it places the embossing step in advance of the cooling and hardening stage and we have found that this is of great importance in providing a siding of high impact strength. In certain prior production systems, an embossing step has been applied subsequent to the cooling and hardening of the extrusion, as by resoftening the surface layer to be embossed and then again hardening that layer after the texture effect has been imparted to the article. This resoftening of the surface layer for the embossing results in shrinkage of the surface layer, with consequent development of stresses throughout the entire product when the surface layer has again been rehardened. This stresses remaining in the product in consequence of this prior technique have resulted in deterioration of the impact strength of the product.

In contrast with the prior technique just referred to, the system of the present invention (providing for embossing in advance of any appreciable cooling and hardening of the siding) eliminates the development of stresses referred to and provides a product of greatly increased impact strength. BY way of example, the siding of the present invention has an impact strength at least as great as about 3 inches lbs. per mil of thickness, which is of the order of 50 percent higher than products embossed by other techniques.

It is therefore an improvement of striking character to provide a product which is not only embossed to provide a grain texture, but which also has both high impact strength and low reflection. By employing various of the improvements provided according to the present invention the light reflection is kept below 50 percent, and usually and most advantageously below about 35 1 percent.

It is also of advantage in the technique of the invention that the puller mechanism and the embosser are driven in synchronism with each other. This aids in providing the desired dimensioning of the siding as it is being cooled in the sizing and cooling mechanism which intervenes between the embosser and the puller.

From FIG. 1a it will be observed that the width of the extrusion is at a maximum at the point of discharge from the extrusion orifice of the die and that the width of the extrusion diminishes rather quickly to the nip of the embossing rolls, after which the width decreases more gradually throughout the cooling section. Various of the templates and other sizing devices are positioned and proportioned appropriately in relation to this shrinkage in width which necessarily occurs in consequence of the cooling of the resin material.

We claim:

1. Apparatus for making thermosplastic resin siding having a curved panel, comprising a resin plasticating extruder having a die with an extrusion orifice of cross sectional shape generally conforming with the cross section of the siding but with the panel forming portion of the orifice substantially flat, an embossing roll positioned to receive the siding panel from the extrusion orifice while the resin is still plasticated, means located downstream of the embossing roll for imparting the desired curvature to the panel, means for cooling the siding downstream of both the embossing roll and the means for imparting the curvature to harden the resin after the panel has been embossed and curved, puller mechanism engaging the hardened siding downstream of the cooling means, and driving mechanism for the embossing roll and for the puller mechanism including means for synchronizing the drive of the embossing roll and the puller mechanism.

2. Apparatus for making thermoplastic resin siding having butt and hanger edges with an intervening panel at least a portion of which is curved, which apparatus comprises a resin plasticating extruder having a die with an extrusion orifice of cross sectional shape generally conforming with the cross section of the siding but with the panel forming portion of the orifice substantially flat, means located downstream of the extrusion orifice for imparting the desired curvature to the panel, and a straight bar mounted to frictionally engage a flat surface of the siding as it is extruded from the die orifice, said bar being located in spaced relation to the die orifice but between the orifice and the means for imparting the curvature to the panel.

3. Apparatus as defined in claim 2 further including means for imparting a texture to the face side of the panel comprising an embossing roll located between the friction bar and the means for imparting the desired curvature to the panel.

* * * * *

UNITED STATES PATENT OFFICE
CERTIFICATE OF CORRECTION

Patent No. 3,825,390                Dated July 23, 1974

Inventor(s) Peter F. Heilmayr and Sol B. Kimbrell

It is certified that error appears in the above-identified patent and that said Letters Patent are hereby corrected as shown below:

Col. 3, Line 25, "formed" should read --cavity--.

Col. 3, Line 46, "which" should read --width--.

Col. 9, Line 39, delete numeral "1".

Signed and Sealed this eighteenth Day of May 1976

[SEAL]

Attest:

RUTH C. MASON
*Attesting Officer*

C. MARSHALL DANN
*Commissioner of Patents and Trademarks*